United States Patent
Shinozaki et al.

[11] Patent Number: 5,616,413
[45] Date of Patent: Apr. 1, 1997

[54] EXPANDABLE STYRENE RESIN BEADS AND SUSPENSION-POLYMERIZATION PROCESS FOR PRODUCING THE SAME

[75] Inventors: Hiroki Shinozaki; Masayuki Tanaka; Yonezo Ueda, all of Mie, Japan

[73] Assignee: Mitsubishi Chemical BASF Company Limited, Yokkaichi, Japan

[21] Appl. No.: 421,244

[22] Filed: Apr. 13, 1995

[30] Foreign Application Priority Data

Apr. 28, 1994 [JP] Japan .................................... 6-091559

[51] Int. Cl.$^6$ .................................................... B32B 5/16
[52] U.S. Cl. ............................. 428/402; 521/56; 521/60; 521/146
[58] Field of Search ..................... 428/402, 158, 428/308.4; 521/56, 60, 98, 146; 526/89

[56] References Cited

U.S. PATENT DOCUMENTS

| | | | |
|---|---|---|---|
| 4,029,614 | 6/1977 | Nintz et al. | 521/2 |
| 4,086,191 | 4/1978 | Hinselmann et al. | 521/57 |
| 4,243,717 | 1/1981 | Gahmig | 428/402 |
| 4,497,911 | 2/1985 | Rigler et al. | 521/56 |
| 4,769,394 | 9/1988 | Hahn et al. | 521/60 |
| 4,973,610 | 11/1990 | Hahn et al. | 521/89 |

FOREIGN PATENT DOCUMENTS

| | | |
|---|---|---|
| 0095714 | 12/1983 | European Pat. Off. . |
| 1172421 | 11/1969 | United Kingdom . |

*Primary Examiner*—H. Thi Le
*Attorney, Agent, or Firm*—Oblon, Spivak, McClelland, Maier & Neustadt, P.C.

[57] ABSTRACT

Expandable styrene resin beads are described, which, when expanded to a bulk density of 20 g/l, give pre-expanded beads in which the number of cells present along those surface parts of radii which range from the bead surface to a depth of 0.2 mm from the surface is from 3 to 20 per mm and the number of cells present along those inner parts of the radii which range from a depth of 1 mm from the bead surface to the bead center is 10 or larger per mm, the number of cells present along said surface parts being smaller than the number of cells present along said inner parts.

2 Claims, 2 Drawing Sheets

EXPANDABLE STYRENE RESIN BEADS AND SUSPENSION-POLYMERIZATION PROCESS FOR PRODUCING THE SAME

FIELD OF THE INVENTION

The present invention relates to expandable styrene resin beads from which a foamed molding having a regulated cell morphology and excellent in surface appearance and mechanical properties can be produced, and which are useful for producing foamed moldings for use as fish container boxes, tote boxes, thermal insulants, cushioning materials for packaging, etc.

BACKGROUND OF THE INVENTION

Foamed styrene resin moldings are a useful material because they not only are relatively inexpensive and can be produced through foaming by low-pressure steam or other means without using a special method, but also are highly effective in cushioning and thermal insulation.

In some application, however, there are cases where the mechanical strength of :foamed styrene resin moldings is still insufficient. If the strength thereof is improved by using a nucleating agent or the like to reduce the cell size of pre-expanded styrene resin beads from which a styrene resin foam is produced, this disadvantageously results in a molding having a melted surface structure and hence an impaired appearance. On the other hand, if the cell size is increased so as to improve appearance, this results in problems including insufficient mechanical strength. Thus, a foamed molding which combines a good surface appearance and sufficient mechanical proerties including impact strength has not been obtained so far.

A technique for improving surface appearance without considerably sacrificing mechanical strength is disclosed in, e.g., JP-A-63-69843, JP-A-63-69844, and JP-A-1-299843, which technique comprises producing expandable styrene resin beads and then forcibly eliminating a foaming agent present around the bead surfaces. (The term "JP-A" as used herein means an "unexamined published Japanese patent application".)

However, the proposed treatment is industrially disadvantageous in that it needs the step of partly removing the foaming agent which has been impregnated into the expandable resin beads.

SUMMARY OF THE INVENTION

The present inventors made intensive studies in order to overcome the above-described problems. As,a result, it has been found that a foamed molding having a good surface appearance and sufficient mechanical strength can be obtained from expandable resin beads which give pre-expanded beads in which the cells present near the beads surfaces are larger in size than the cells present inside the beads. The present invention has been completed based on this finding.

The present invention provides expandable styrene resin beads which, when expanded to a bulk density of 20 g/l, give pre-expanded beads in which the number of cells present along those surface parts of radii which range from the bead surface to a depth of 0.2 mm from the surface is from 3 to 20 per mm and the number of cells present along those inner parts of the radii which range from a depth of 1 mm from the bead surface to the bead center is 10 or larger per mm, the number of cells present along the surface parts being smaller than the number of cells present along the inner parts.

The present invention further provides, as one method for obtaining the expandable styrene resin beads capable of giving pre-expanded beads having the above-described cell morphology, a process for suspension-polymerizing a styrene monomer in an aqueous medium in the presence of polymerization initiator(s) and suspension stabilizer(s), which process contains the step of adding an electrolyte at a concentration of from 0.02 to 5.0 mol/l based on the amount of the aqueous medium at the time when the conversion of the monomer into a polymer has reached 30% or a higher value.

DETAILED DESCRIPTION OF THE INVENTION

The expandable styrene resin beads of the present invention, when expanded to a bulk density of 20 g/l, give pre-expanded beads in which the number of cells present along those surface parts of radii which range from the bead surface to a depth of 0.2 mm from the surface is from 3 to 20 per mm, preferably from 4 to 15 per mm and the number of cells present along those inner parts of the radii which range from a depth of 1 mm from the bead surface to the bead center is 10 or larger per mm and preferably up to 50 per mm, the number of cells present along the surface parts being smaller than the number of cells present along the inner parts.

If the number of cells present in the surface parts is smaller than 3 per mm, the surface cell diameter is so large that a poor molding appearance tends to result. If the number thereof exceeds 20 per mm, the expandable beads have a problem that they give a molding having a melted surface and hence an impaired appearance.

On the other hand, if the number of cells present in the inner parts is smaller than 10 per mm, this results in a problem that the molding obtained is insufficient in mechanical strengths including impact strength.

If the number of cells present in the surface parts is larger than the number of cells present in the inner parts, such expandable beads, even though these cell numbers are within the respective ranges specified above, give a molding which has a poorer surface appearance than moldings having almost the same strength and which therefore cannot combine sufficient strength and a good surface appearance.

In the present invention, the size of cell diameter is expressed in terms of the number of cells for convenience. Namely, that the number of cells present in the surface parts is from 3 to 20 per mm means that the cell diameter is large, while that the number of cells present in the inner parts is 10 or more and larger than the number of cells present in the surface parts means that the inner parts have a smaller cell diameter than the surface parts.

The number of cells for one of pre-expanded beads having a bulk density of 20 g/l was determined by cutting the bead into true halves with a razor, counting the cells present along each of three arbitrary radii using an optical microscope (each space between resin walls was regarded as one cell), converting the found cell numbers into values per mm, and averaging the three values.

This calculation method is illustratively explained below by reference to FIGS. 4(a) and 4(b).

Method for Determining Number of Cells:

Cells present in either of the true halves of a pre-expanded bead are counted along each of three arbitrary lines, A-a, B-b and C-c, passing through the center, 0, of the bead.

Figure 4A:
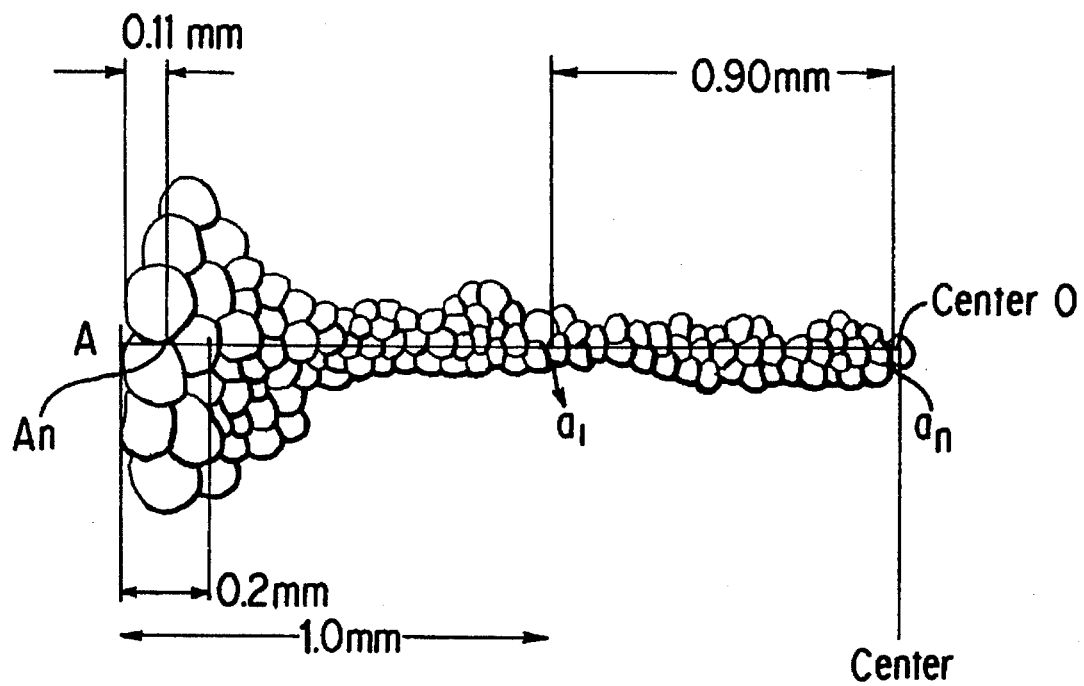
FIGS. 4(a) and 4(b) illustrate an example of the method for cell number determination.
Figure 4B:
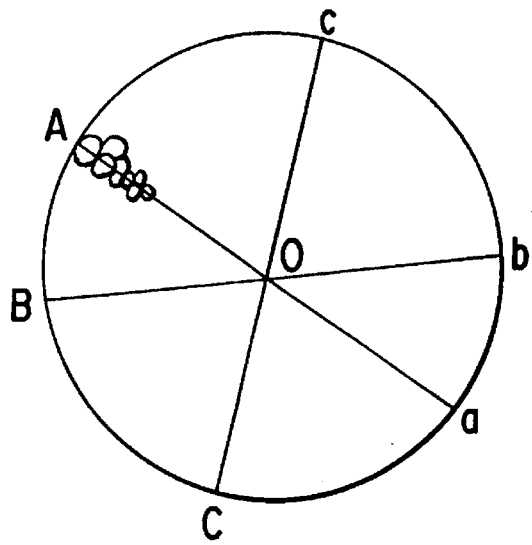

First, the number of cells present along that surface part of a radius of the pre-expanded bead which part ranges from the bead surface to a depth of 0.2 mm from the surface (the number of surface cells) was determined by counting the cells (chambers partitioned by cell walls) present along the line extending from point A to a distance of 0.2 mm from point A toward the center $0$ in FIG. 4(a), dividing the number ($N_A$) of the counted cells by the distance, $A-A_n$ (mm), between point A and the cell wall present within the 0.2 mm range and farthest from point A, and rounding the quotient by counting fractions of 0.5 and over as a unit and cutting away the rest.

If less than one cell is present within the 0.2 mm range from point A because of a too large cell size, the number of cells was regarded as 1 and this cell number was divided by that distance on line A-$0$ which was occupied by the cell.

In the case of the pre-expanded bead shown in FIG. 4 (a), $$\text{Number of surface cells} = \frac{N_A}{(A - A_n)} = \frac{1}{0.11 \text{ (mm)}} \quad (=9.1) = 9/\text{mm}.$$

On the other, the number of cells present along that inner part of the radius which ranges from a depth of 1 mm from the bead surface to the bead center (the number of inner cells) was determined by counting the cells (chambers partitioned by cell walls) present along line A-$0$ except the part ranging from point A to a distance of 1 mm therefrom, dividing the number ($N_a$) of the counted cells by distance $a_1-a_n$ (mm), and rounding the quotient by counting fractions of 0.5 and over as a unit and cutting away the rest. In the case of the pre-expanded bead Shown in FIG. 4 (a), $$\text{Number of inner cells} = \frac{N_a}{(a_1 - a_n)} = \frac{16}{0.90} \quad (=17.8) = 18/\text{mm}.$$

Examples of methods for controlling the number of cells include a technique of changing the addition amount of an ordinarily used nucleating agent, e.g., polyethylene wax, or of the electrolyte for use in the present invention. Reducing the addition amount of the electrolyte increases the number of surface cells without considerably changing the number of inner cells, while increasing the addition amount of the electrolyte reduces the number of surface cells without considerably changing the number of inner cells.

The number of inner cells can be controlled by changing the addition amount of a nucleating agent, e.g., a polyethylene wax, an inorganic filler such as talc or silica, or a halogenated hydrocarbon. Reducing the addition amount of the nucleating agent decreases the number of inner cells, while increasing the addition amount of the nucleating agent increases the number of inner cells.

One process for obtaining the above-described expandable styrene resin beads of the present invention comprises dispersing a styrene monomer into an aqueous medium in the presence of polymerization initiator(s) and suspension stabilizer(s), subsequently initiating a polymerization reaction, adding an electrolyte at a concentration of from 0.02 to 5.0 mol/l based on the amount of the aqueous medium at the time when the conversion of the monomer into a polymer has reached a value in the range of from 30% to 100% to carry out the suspension polymerization, and incorporating a foaming agent by either adding the same during the suspension polymerization or impregnating the same after the polymerization.

Examples of the styrene monomer for use in the suspension polymerization process of the present invention include styrene, α-methylstyrene, vinyltoluene, p-methylstyrene, p-ethylstyrene, sodium styrenesulfonate, and chlorostyrene. These styrene monomers may be used in combination with one or more of other vinyl compounds including acrylic vinyl compounds such as acrylic acid, methyl acrylate, ethyl acrylate, propyl acrylate, butyl acrylate, and 2-ethylhexyl acrylate; methacrylic vinyl compounds such as methacrylic acid, methyl methacrylate, ethyl methacrylate, propyl methacrylate, butyl methacrylate, and 2-ethylhexyl methacrylate; acrylonitrile; crosslinking bifunctional vinyl compounds such as divinylbenzene and ethylene glycol dimethacrylate; and other vinyl compounds such as glycidyl acrylate and glycidyl methacrylate.

Examples of the polymerization initiator for use in the suspension polymerization process of the present invention include monomer-soluble initiators such as azo compounds, e.g., azobisisobutyronitrile, cumene hydroperoxide, dicumyl peroxide, t-butyl peroxy-2ethylhexanoate, t-butyl peroxybenzoate, benzoyl peroxide, t-butyl peroxyisopropylcarbonate, and lauroyl peroxide. The polymerization initiator is usually used in an amount of preferably from 0.01 to 3 parts by weight per 100 parts by weight of the whole monomer introduced in the polymerization system.

Ordinary suspension stabilizers on the market can be utilized as the suspension stabilizer for use in the suspension polymerization process of the present invention. Examples thereof include water-soluble polymers such as poly(vinyl alcohol), methyl cellulose, and poly(vinylpyrrolidone) and difficultly soluble inorganic salts such as magnesium pyrophosphate and calcium tertiary phosphate. These suspension stabilizers may be used in combination with a surfactant. In the case of employing a difficultly soluble inorganic salt, this salt is preferably used in combination with an anionic surfactant, e.g., sodium α-olefinsulfonate or sodium dodecylbenzenesulfonate.

The suspension stabilizer is used preferably in an amount of from 0.01 to 5.0 parts by weight per 100 parts by weight of the whole monomer introduced in the polymerization system. In the case of using a combination of any of the aforementioned difficultly soluble inorganic salts and any of the aforementioned anionic surfactant, the amounts of the difficultly soluble inorganic salt and the anionic surfactant are preferably from 0.05 to 3.0 parts by weight and from 0.0001 to 0.5 parts by weight, respectively, per 100 parts by weight of the whole monomer introduced in the polymerization system.

The electrolyte for use in the suspension polymerization process of the present invention is not particularly limited, and any electrolyte maybe used as long as it ionizes in aqueous solution. Examples thereof include inorganic salts such as lithium chloride, sodium chloride, magnesium chloride, potassium chloride, calcium chloride, ammonium chloride, sodium sulfate, magnesium sulfate, potassium sulfate, aluminum sulfate, ammonium sulfate, sodium nitrate, magnesium nitrate, potassium nitrate, calcium nitrate, sodium carbonate, magnesium carbonate, potassium carbonate, calcium carbonate, and ammonium carbonate and water-soluble alkali metal salts of carboxylic acids such as potassium acetate, sodium acetate, sodium octanoate, sodium benzoate, and disodium succinate. Of these, sodium chloride is especially preferred in that it is effective in easily obtaining the expandable styrene resin beads of the present invention even when added in a small amount and that this electrolyte is suitable for industrial use because it is available at low cost in large quantities.

It is important that the electrolyte should be added at the time when the conversion of the monomer into a polymer has reached 30% or a higher value. If the electrolyte is added at a conversion lower than 30%, not only expandable styrene resin beads having the cell morphology of the present invention cannot be obtained, but also the finally obtained expandable resin beads may have too large particle diameters and suffer deformation. In addition, there are cases where the suspension system during polymerization becomes instable and bulks, depending on polymerization conditions. The addition of the electrolyte is desirably conducted at the time when the conversion of the monomer into a polymer is in the range of from 50 to 100%, preferably from 75 to 100%.

The value of this conversion can be determined by the specific gravity method, infrared absorption spectrometry, gas chromatography, or another method.

The amount of the electrolyte added to the aqueous medium is from 0.02 to 5.0mol/l, preferably from 0.03 to 1.0 mol/l, based on the amount of the aqueous medium. If the amount thereof is smaller than 0.02 mol/l, expandable resin beads having a sufficient cell morphology cannot be obtained. Even if the electrolyte is added in an amount larger than 5.0 mol/l, this only results in an increased production cost. In some cases, such a large electrolyte amount causes the suspension system during polymerization to become instable and bulk, depending on the suspension stabilizer(s) used in combination with the electrolyte.

The electrolyte may be added as a powder or an aqueous solution, either at a time or portion-wise after the conversion of the monomer into a polymer has reached 30% or a higher value.

The suspension polymerization process of the present invention can be applied to the production of expandable polymer beads containing a foaming agent. In this case, the foaming agent is added during or after the suspension polymerization to incorporate the same into the polymer beads.

Examples of the foaming agent include physical foaming agents such as aliphatic hydrocarbons, e.g., propane, n-butane, isobutane, n-pentane, isopentane, neopentane, and hexane, alicyclic hydrocarbons, e.g., cyclobutane and cyclopentane, and halogenated hydrocarbons, e.g., methyl chloride and dichlorofluoromethane; and inorganic gases such as carbon dioxide gas, nitrogen, and ammonia. These foaming agents may be used alone or in combination of two or more thereof.

The foaming agent is fed usually in such an amount as to yield polymer beads having a foaming agent content of from 1 to 20% by weight. It is possible to add a nucleating agent to the vinyl monomer beforehand. Examples of the nucleating agent include ethylenebisstearamide, methylenebisstearamide, and ethylene-vinyl acetate copolymers.

If desired and necessary, to regulate a molecular weight a chain transfer agent such as an alkyl mercaptan, e.g., dodecyl mercaptan, or α-methylstyrene dimer may be added to the polymerization reaction system in the suspension polymerization process of the present invention. This chain transfer agent is usually used in an amount of preferably from 0.01 to 3 parts by weight per 100 parts by weight of the whole monomer to be polymerized.

The addition of the monomer to the aqueous medium may be conducted at a time. Alternatively, the monomer may be added gradually with progress of the polymerization. (See JP-B-46-2987 and JP-B-49-2994; the term "JP-B" as used herein means an "examined Japanese patent publication.")

If desired and necessary, a plasticizer for the polymer to be yielded, e.g., a phthalic ester such as dioctyl phthalate, or another organic compound, e.g., a fatty ester or toluene, may be added to the polymerization reaction system in the suspension polymerization process of the present invention.

Additives generally used in the production of expandable resin beads may be suitably added. Examples of such additives include flame retardants, flame retardant aids, antistatic agents, conductivity-imparting agents, nucleating agents, and narrow beads size distribution agents. It is also possible to mix a rubber ingredient such as butadiene rubber or styrene-butadiene rubber.

The expandable resin beads obtained may be heat-treated to improve the surface appearance of the molded article to be obtained from the beads. The expandable resin beads of the present invention can give a molding which combines a sufficient surface appearance and a sufficient strength as compared with a molding obtained by conventional beads.

The present invention will be explained below in more detail by reference to the following Examples and Comparative Examples, but the invention should not be construed as being limited to these Examples.

EXAMPLE 1

Into a 50-liter autoclave equipped with a stirrer were introduced 20 l of ion-exchanged water, 50 g of calcium tertiary phosphate (manufactured by Taihei Chemical Industrial Co., Ltd., Japan), 0.6 g of sodium dodecylbenzenesulfonate, and 3.6 g of polyethylene wax (PW1000, manufactured by Petrolite Corp.).

Thereto was then added, with stirring, a solution obtained by dissolving 45 g of t-butyl peroxy-2ethylhexanoate, 27 g of 1,1-bis(t-butylperoxy)-3,3,5-trimethylcyclohexane, and 270 g of cyclohexane as a plasticizer into 18 kg of styrene monomer.

The mixture was stirred at room temperature for 30 minutes, and then heated to 90° C. over a period of 1 hour. This mixture was subsequently heated from 90° C to 100° C. over a period of 5.5 hours, during which the suspension in the autoclave was sampled at 4 hours after initiation of this heating to examine the conversion of the monomer into a polymer. As a result, the conversion was found to be 50%. At this time, 700 g of 25% aqueous sodium chloride solution (which amount corresponded to a concentration of 0.15 mol/l based on the ion-exchanged water) was introduced into the autoclave over a period of 5 minutes. Thereafter, 1.7 kg of pressurized butane was fed to the autoclave. =This reaction mixture was further heated from 100° C. to 110° C. over a period of 1.5 hours and then maintained at this temperature for 2 hours.

The resulting reaction mixture was cooled to room temperature, and the expandable resin beads were then taken out therefrom with a centrifugal separator. The water adherent to the bead surfaces was removed with a fluidization dryer and then expanded to a bulk density of 20 g/l in a ordinary way using a pre-expanding machine (DYH-850, manufactured by Daisen K.K., Japan).

The pre-expanded beads thus obtained were allowed to stand (aged) at room temperature for one day and then packed into a box-shaped mold having dimensions of 28×35×15 cm. The packed beads were heated by steam blowing at a pressure of 0.6 kg/cm$^2$.G for 20 seconds and then at 1.0 kg/cm$^2$.G for 20 seconds to obtain a foamed molding.

The inner-water content of the expandable resin beads obtained above, the number of cells in the pre-expanded beads, and the surface appearance and falling ball impact strength height of the foamed molding were evaluated by the following method.

Evaluation Methods

Inner-water content: The expandable resin beads were examined by the Karl Fischer's method within 24 hours from the production thereof.

Number of cells: One of the pre-expanded beads having a bulk density of 20 g/l was cut into true halves with a razor. The cells present along that surface part of a radius of the pre-expanded bead which part ranged from the bead surface to a depth of 0.2 mm from the surface and the cells present along that inner part of the radius which part ranged from a depth of 1 mm from the bead surface to the bead center (each space between resin walls was regarded as one cell) were counted using an optical microscope, and each number of cells was converted to a value per mm.

Surface appearance: The surface appearance of the foamed molding was visually evaluated based on the following criteria.

Good; satisfactory appearance with no melted beads and no gap between beads.

Slightly poor; unsatisfactory appearance because of melted beads present on the surface or of too large surface cell diameters.

Poor; having melted beads and gap between beads.

Falling ball impact strength height: IA steel ball weighing 255 g was dropped from various heights onto test samples of the foamed molding, and the dropping height at which 50% of the samples broke was measured (in accordance with JIS K7211).

EXAMPLE 2

The same procedure as in Example 1 was carried out, except that the addition of 700 g of 25% aqueous sodium chloride solution was conducted after the butane feeding and at 5.5 hours after the temperature of the system had reached 90° C. (the conversion at the time of this sodium chloride addition was 75%).

EXAMPLE 3

The same procedure as in Example 1 was carried out, except that the addition of 700 g of 25% aqueous sodium chloride solution was conducted after the reaction mixture was maintained at 110° C. for 2 hours (the conversion at the time of this sodium chloride addition was 99%).

EXAMPLE 4

The same procedure as in Example 1 was carried out, except that 2,300 g of 20% aqueous sodium sulfate solution (which amount corresponded to a concentration of 0.15 mol/l based on the ion-exchanged water) was used in place of 700 g of 25% aqueous sodium chloride solution.

EXAMPLE 5

The same procedure as in Example 1 was carried out, except that 2,200 g of 20% aqueous sodium acetate solution (which amount corresponded to a concentration of 0.15 mol/l based on the ion-exchanged water) was used in place of 700 g of 25% aqueous sodium chloride solution.

EXAMPLE 6

The same procedure as in Example 1 was carried out, except that 4,800 g of 20% aqueous sodium succinate solution (which amount corresponded to a concentration of 0.15 mol/l based on the ion-exchanged water) was used in place of 700 g of 25% aqueous sodium chloride solution.

EXAMPLE 7

The same procedure as in Example 1 was carried out, except that the amount of the 25% aqueous sodium chloride solution was changed to 3,500 g (corresponding to a concentration of 0.66 mol/l based on the ion-exchanged water) and that the addition of this solution was conducted at 5.5 hours after the temperature of the system had reached 90° C. (the conversion at the time of this addition was 75%).

COMPARATIVE EXAMPLE 1

The same procedure as in Example 1 was carried out, except that the 25% aqueous sodium chloride solution was not added.

COMPARATIVE EXAMPLE 2

The same procedure as in Example 1 was carried out, except that the addition of 700 g of 25% aqueous sodium chloride solution was conducted before the reaction mixture was heated to 90° C. (the conversion at the time of this addition was 0%).

COMPARATIVE EXAMPLE 3

The same procedure as in Example 1 was carried out, except that the amount of the 25% aqueous sodium chloride solution was changed to 30 g (corresponding to a concentration of 0.006 mol/l based on the ion-exchanged water).

COMPARATIVE EXAMPLE 4

The same procedure as in Example 1 was carried out, except that sodium chloride was added in an amount of 8 kg (corresponding to a concentration of 6.8 mol/l based on the ion-exchanged water).

Table 1 summarizes the kind and amount of the electrolyte, the average particle diameter and inner-water content of the expandable resin beads obtained, the number of cells in the pre-expanded beads, and the surface appearance and falling ball strength height of the foamed molding-for each of the above Examples and Comparative Examples.

TABLE 1

| | Kind of electrolyte | Amount of electrolyte (based on ion-exchanged water) (wt %) | (mol/l) | Conversion at the time of electrolyte addition (%) | Expandable resin beads Average particle diameter (mm) | Inner-water content after production (%) | Number of cells in pre-expanded beads, surface part/inner part | Foamed molding Surface appearance | Falling ball strength height (cm) |
|---|---|---|---|---|---|---|---|---|---|
| Example 1 | sodium chloride | 0.85 | 0.15 | 50 | 1.0 | <0.1 | 7/20 | good | 35 |
| Example 2 | sodium chloride | 0.85 | 0.15 | 75 | 1.0 | <0.1 | 8/20 | good | 35 |
| Example 3 | sodium chloride | 0.85 | 0.15 | 99 | 1.0 | <0.1 | 9/23 | good | 36 |
| Example 4 | sodium sulfate | 2.1 | 0.15 | 50 | 1.0 | <0.1 | 8/22 | good | 35 |
| Example 5 | sodium acetate | 2.0 | 0.15 | 50 | 1.0 | <0.1 | 7/19 | good | 35 |
| Example 6 | disodium succinate | 3.9 | 0.15 | 50 | 1.0 | <0.1 | 6/18 | good | 34 |
| Example 7 | sodium chloride | 3.7 | 0.66 | 75 | 1.0 | <0.1 | 4/12 | good | 33 |
| Comp. Example 1 | none | 0 | 0 | — | 1.0 | 0.2 | 35/21 | poor | 36 |
| Comp. Example 2 | sodium chloride | 0.85 | 0.15 | 0 | 1.5 | 0.2 | 25/20 | poor | 35 |
| Comp. Example 3 | sodium chloride | 0.037 | 0.006 | 50 | 1.0 | 0.2 | 35/20 | poor | 36 |
| Comp. Example 4 | sodium chloride | 28.6 | 6.8 | 50 | 1.0 | <0.1 | 2/8 | slightly poor | 23 |

Figure 1:
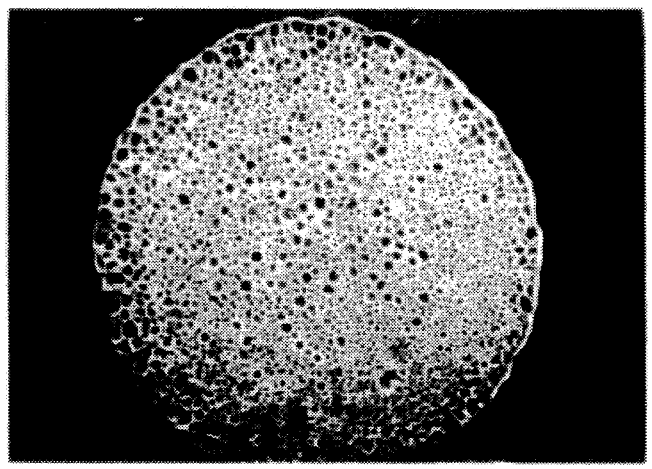
FIG. 1 is an electron photomicrograph (x19) showing the bead structure on a section of a pre-expanded bead obtained in Example 2.
Figure 2:
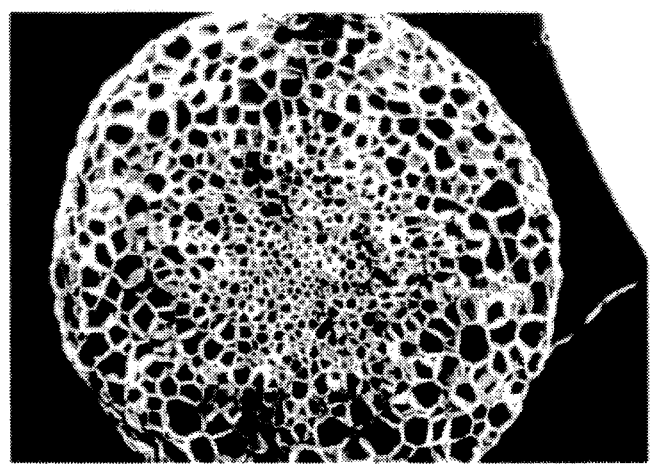
FIG. 2 is an electron photomicrograph (x19) showing the bead structure on a section of a pre-expanded bead obtained in Example 7.
Figure 3:
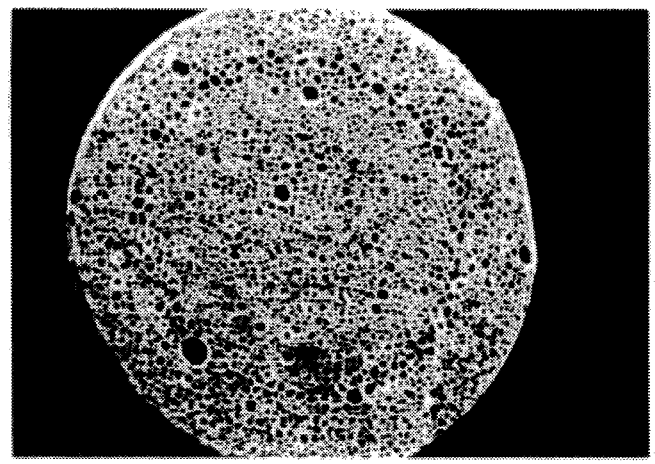
FIG. 3 is an electron photomicrograph (x19) showing the bead structure on a section of a pre-expanded bead obtained in Comparative Example 1.

Electron photomicrographs showing the bead structures on sections of pre-expanded beads obtained in Example 2, Example 7, and Comparative Example 1 are given in FIGS. 1 to 3, respectively.

The foamed moldings formed from the expandable resin beads of the present invention have a good surface appearance and sufficient mechanical strength.

While the invention has been described in detail and with reference to specific embodiments thereof, it will be apparent to one skilled in the art that various changes and modifications can be made therein without departing from the spirit and scope thereof.

What is claimed is:

1. Expandable styrene resin beads which, when expanded to a bulk density of 20 g/l, give pre-expanded beads in which the number of cells present along those surface parts of radii which range from the bead surface to a depth of 0.2 mm from the surface is from 3 to 20 per mm and the number of cells present along those inner parts of the radii which range from a depth of 1 mm from the bead surface to the bead center is 10 or larger per mm, the number of cells present along said surface parts being smaller than the number of cells present along said inner parts.

2. The expandable styrene resin beads as claimed in claim 1, wherein the number of cells present along those inner parts of the radii which range from a depth of 1 mm from the bead surface to the bead center is from 10 to 50 per mm.

* * * * *